UNITED STATES PATENT OFFICE.

DAVID A. WRAY, OF PITTSBURG, PENNSYLVANIA, ASSIGNOR OF ONE-HALF TO SAMUEL M. BOYD, OF SAME PLACE.

COMPOSITION FOR ROOFING, PAVING, &c.

SPECIFICATION forming part of Letters Patent No. 491,395, dated February 7, 1893.

Application filed October 16, 1891. Renewed October 25, 1892. Serial No. 449,939. (No specimens.)

*To all whom it may concern:*

Be it known that I, DAVID A. WRAY, a citizen of the United States, and a resident of Pittsburg, in the county of Allegheny and State of Pennsylvania, have invented certain new and useful Improvements in Compounds or Compositions for Roofing, Paving, or other Similar Purposes; and I do hereby declare that the following is a full, clear, and exact description thereof, which will enable others skilled in the art to which it appertains to make and use the same.

My invention relates to an improved composition for roofing, paving and other similar purposes, whereby I obtain an elastic and durable material suitable for the above uses, which shall possess advantages over and be superior to the ordinary compounds or compositions in general use.

The invention consists in the process and article hereinafter described and claimed.

In carrying my invention into effect, I use as a base or body of the compound or composition, tar or the residuum of oils or the heavier products of oils, and while in a heated or boiling condition in a suitable tank or receptacle, treat the same, or mix in the same, while in such condition, chloride of sulphur, chloride and tincture of iron or the vapors arising therefrom in such manner and in such quantities as to make a thorough and complete mixture, of the proper consistency or hardness, care being taken not to allow the same to burn or coke, the resultant product being elastic, hard and impervious to the detrimental effects of rain and dampness as well as heat.

The proportions of the ingredients are about as follows—Tar ninety parts, chloride of sulphur five parts, and chloride of iron five parts, although these may vary owing to circumstances or the condition and quality of the tar employed.

Having thus described my invention, what I claim is:

The herein described roofing and paving compound or composition consisting of tar or the residuum or heavier products of oils, mixed with chloride of sulphur and chloride of iron in the manner and in about the proportions, substantially as specified.

In testimony that I claim the foregoing as my own I have hereunto affixed my signature in presence of two witnesses.

DAVID A. WRAY.

Witnesses:
S. M. BOYD,
F. W. JOHNS.